B. E. BYRD.
REGISTERING ATTACHMENT FOR SYRUP DISPENSERS.
APPLICATION FILED NOV. 28, 1916.
1,280,658.
Patented Oct. 8, 1918.
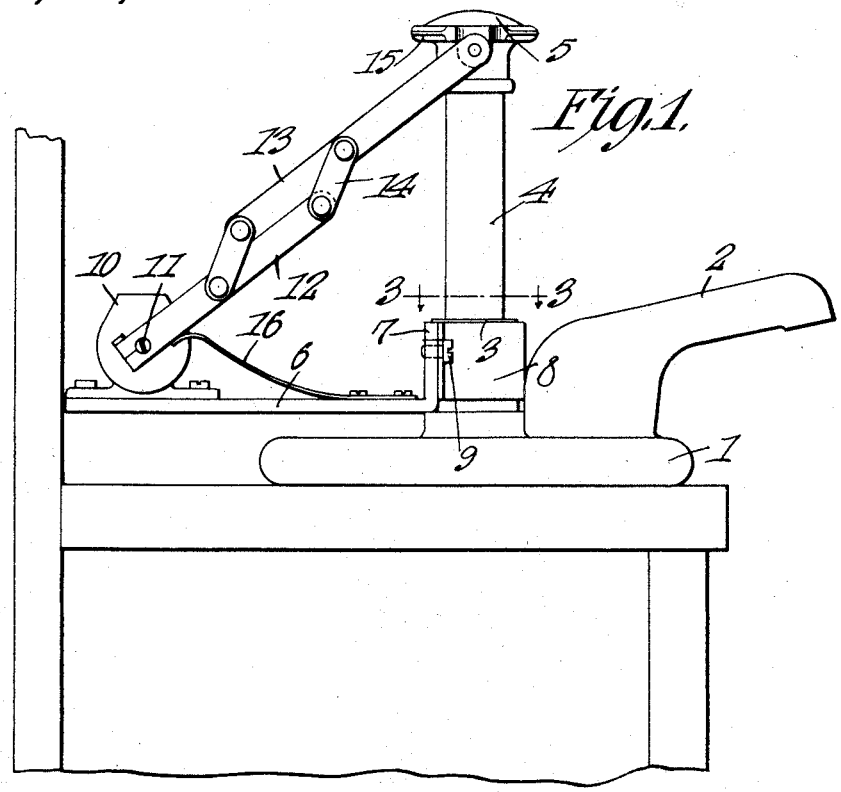
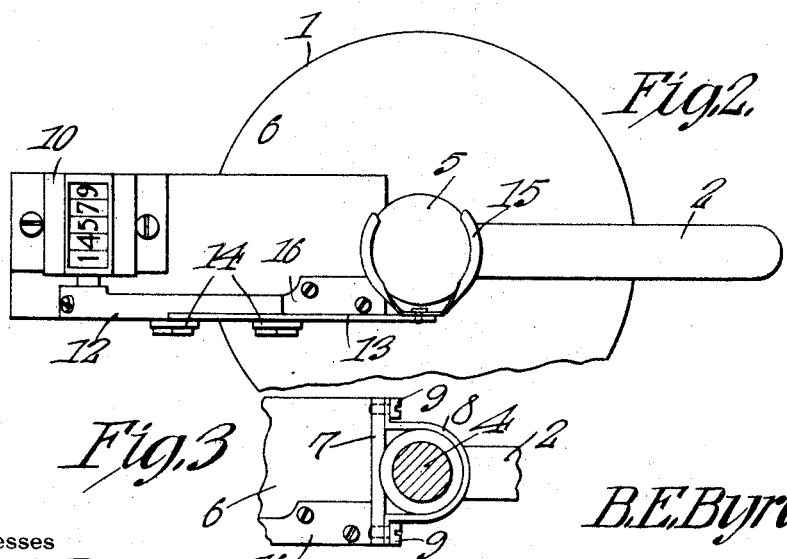
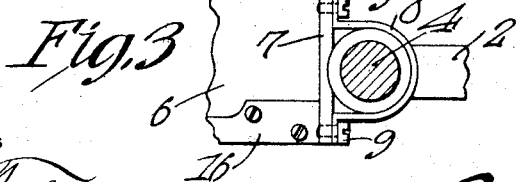
Witnesses
B. E. Byrd
Inventor
by C. A. Snow & Co.
Attorneys

UNITED STATES PATENT OFFICE.

BRITTON E. BYRD, OF DURHAM, NORTH CAROLINA.

REGISTERING ATTACHMENT FOR SYRUP-DISPENSERS.

1,280,658. Specification of Letters Patent. Patented Oct. 8, 1918.

Application filed November 28, 1916. Serial No. 133,951.

*To all whom it may concern:*

Be it known that I, BRITTON E. BYRD, a citizen of the United States, residing at Durham, in the county of Durham and State of North Carolina, have invented a new and useful Registering Attachment for Syrup-Dispensers, of which the following is a specification.

This invention relates to a registering attachment for syrup dispensers such as used at soda fountains, one of the objects of the invention being to provide a means whereby an accurate count will be kept of the number of depressions of the plunger used in connection with the dispensing apparatus.

It has been estimated that a syrup such as used in compounding berevages at soda fountains can be divided into a predetermined number of portions to the gallon or other unit of measure or, in other words, a measured quantity of syrup should be sufficient for a minimum number of drinks. Very often, due to the carelessness or dishonesty of the dispensing clerk, the syrup gives out long before the proper number of drinks has been compounded, thus entailing considerable loss to the proprietor.

One of the objects of the present invention is to provide an attachment which can be applied readily to the dispensing mechanism of a syrup holder and which will record the number of operations of the dispensing apparatus so that the proprietor can thus keep a fairly accurate account of the number of drinks dispensed and can compare the same with the number of checks sold.

A further object is to provide an attachment which is simple, compact and durable, can be readily applied, and does not detract from the appearance of the counter.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of a portion of a syrup dispensing apparatus with the present improvements combined therewith.

Fig. 2 is a plan view of the structure shown in Fig. 1.

Fig. 3 is a section on line 3—3 of Fig. 1.

Referring to the figures by characters of reference 1 designates the cap of a syrup container, and from this cap extends the usual outlet spout 2 and a central guide sleeve 3. A plunger 4 is mounted to work within the guide sleeve and through the cap and is provided at its upper end with a knob 5.

The parts hereinbefore described do not constitute any part of the present invention but are to be found on various types of soda dispensing apparatus.

The present attachment includes a base plate 6 provided at one end with an upstanding tongue 7 to which are secured the ends of a yoke 8, this yoke being adapted to straddle the sleeve 3 and to clamp the sleeve between the yoke and the tongue 7. Screws 9 are preferably used for holding the end portions of the tongue 7 to the ends of the yoke.

Secured upon the base 6 is a register 10 of any well known type, the one illustrated being the well known "Veeder". The actuating shaft 11 of the register has an arm 12 radiating therefrom and clamped thereon. This arm 12 is lapped by another arm 13 movably connected thereto but maintained parallel therewith by parallel links 14. Arm 13 extends beyond the upper end of the arm 12 and is pivotally connected at its free end to a clip 15 or the like which embraces and is tightly clamped upon the knob 5 or can, if preferred, be secured upon the stem 4 below the knob.

A spring 16 is secured to the base plate 6 and bears upwardly against arm 12, thus to hold the two arms normally elevated.

It will be apparent that each time the plunger 4 is depressed the arms 13 and 12 will move downwardly relative to each other and as the distance between the clip 15 and the shaft 11 diminishes during the downward movement of the plunger 4, the links 14 will swing relative to the arms 12 and 13, thus to compensate for this variation in distance. Each downward stroke of plunger 4 and consequent operation of the arms 12 and 13 will result in the rotation of shaft 11 and the compression of spring 16 and, when the plunger is released subsequent to the ejection of the measured portion of syrup, said plunger will move upwardly to its initial position and the spring 16 will return the arms 12 and 13 to their initial positions while the register 10 will record one operation. Obviously each time the plunger is depressed the operation will be recorded and thus the number of operations taking place in a given time can be accurately determined. It is to be understood that the spring 16 is not used for the purpose of elevating the plunger 4 but merely for insuring the return movement of the arms 12 and 13 when the plunger 4 is raised so that the elevation of the arms 12 and 13 will not be dependent upon the pull exerted from the plunger 4 through the clip 15 to the arms 13. As the spring 16 operates to elevate the arms 12 and 13 the clip 15 can be very light and only lightly engage the head of the plunger. This clip, as a result, will not be subjected to excessive strain and uncouple the arm 13 from the plunger.

A device such as herein described is advantageous because of its compact construction, its simplicity, and the ease with which it may be applied.

What is claimed is:—

A registering attachment for syrup dispensers including a base, a yoke upon the base for attachment to the guide sleeve of a dispenser, a register secured upon the base, a clip for engagement with the plunger of a syrup dispenser, a connection between the register and the clip and including parallel arms and parallel links connecting the arms.

In testimony that I claim the foregoing as my own, I have hereto affixed my signature in the presence of two witnesses.

BRITTON E. BYRD.

Witnesses:
H. G. COLEMAN,
F. J. ANDREW.

Copies of this patent may be obtained for five cents each, by addressing the "Commissioner of Patents, Washington, D. C."